Jan. 8, 1952 L. R. GRUSS 2,581,856
VEHICLE SUSPENSION
Filed Nov. 17, 1948 2 SHEETS—SHEET 1
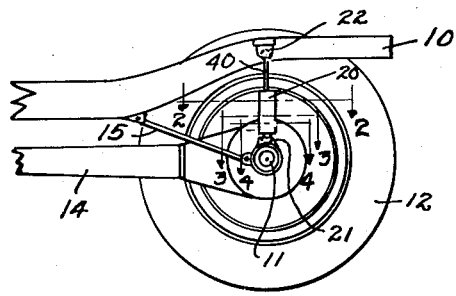
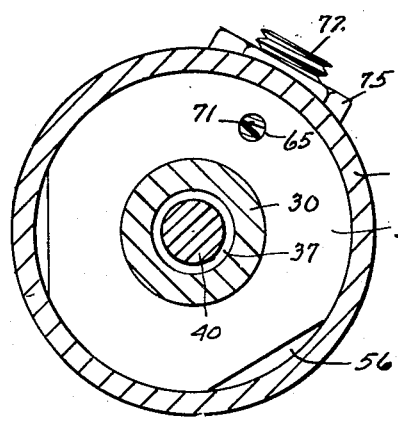
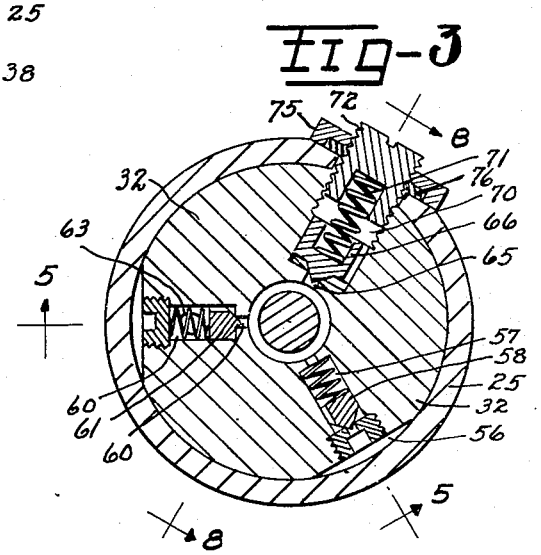
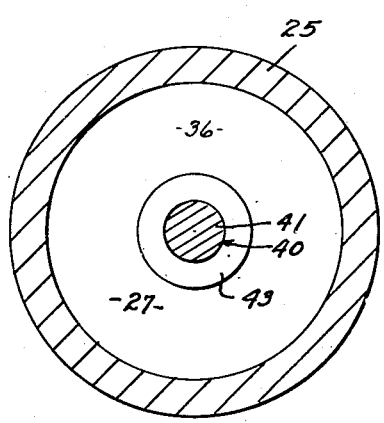
INVENTOR.
LUCIEN R. GRUSS
BY
Bates, Teare y McBean
ATTORNEYS Jan. 8, 1952  L. R. GRUSS  2,581,856
VEHICLE SUSPENSION
Filed Nov. 17, 1948  2 SHEETS—SHEET 2
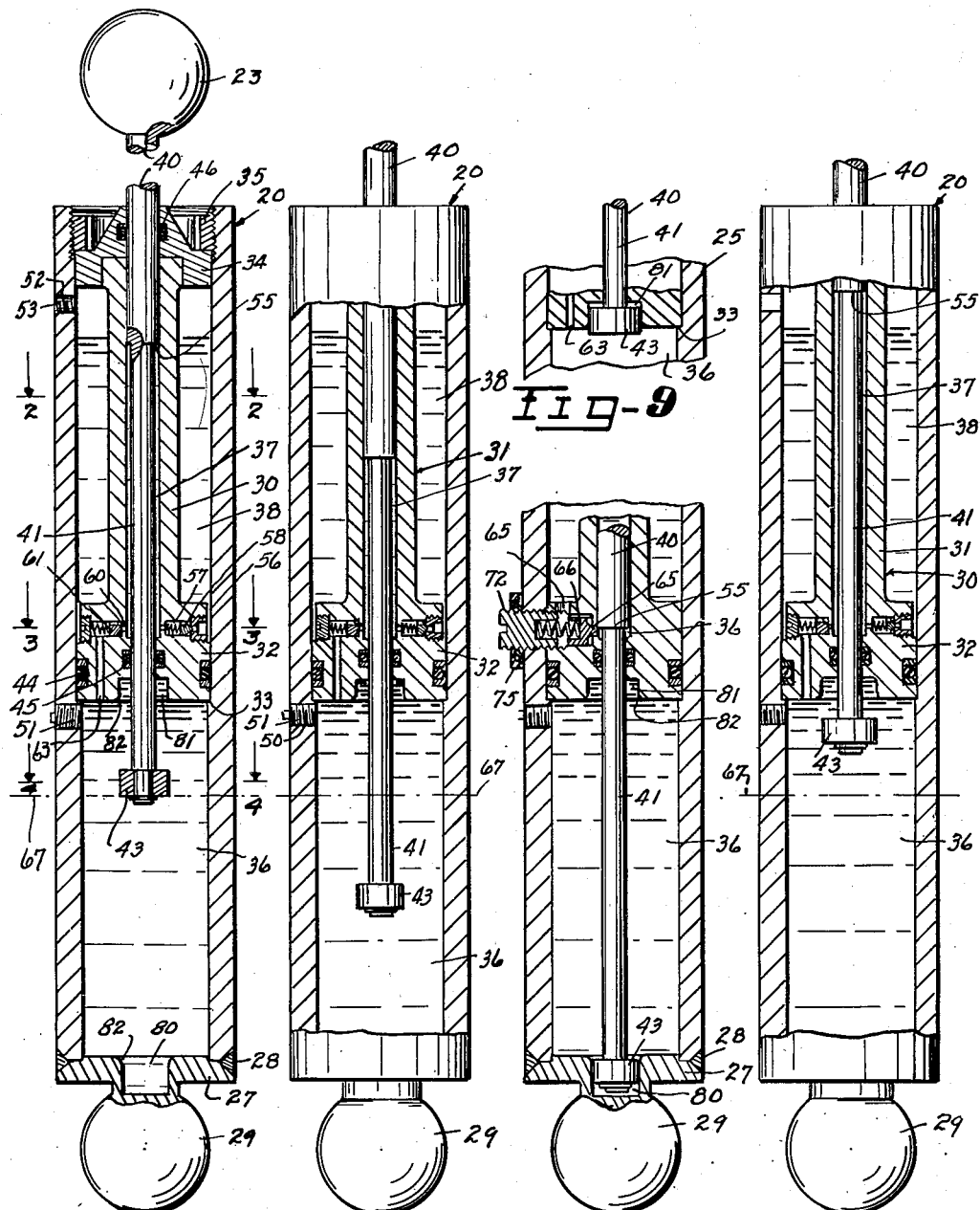
INVENTOR.
LUCIEN R. GRUSS
BY
Bates, Teare & McBean
ATTORNEYS Patented Jan. 8, 1952

2,581,856

UNITED STATES PATENT OFFICE 2,581,856

VEHICLE SUSPENSION

Lucien Robert Gruss, Middletown, Ohio

Application November 17, 1948, Serial No. 60,440

3 Claims. (Cl. 267—64)

1

This invention relates to a hydraulic device for use in the suspension of vehicle bodies, and particularly to an improved hydraulic device for supporting motor vehicle bodies on the axles in place of springs and the like. These, therefore, are the general objects of the present invention.

At the present time various types of metallic coil and leaf springs are interposed between motor vehicle bodies and their axles. Such springs support the body and absorb some of the road shocks, but have been far from satisfactory, as is evidenced by the use, in most motor vehicles, of supplemental shock-absorbing devices to control the action of the springs. The present invention provides an improved hydraulic device which may be substituted for such metallic springs and which will take the place of both the metallic spring and the shock absorbers, and which will improve the riding qualities of the vehicle with which they are used. Accordingly, this is a more specific object of this invention.

Another object of this invention is to provide a hydraulic device to resiliently support a motor vehicle body on its axle structure wherein the weight of the vehicle and its load will be supported by a body of precompressed compressible liquid, and wherein road shocks will be absorbed by further compressing such body of liquid, and wherein the movement of the vehicle under normal driving conditions will insure the maintenance of the load supporting pressure of the body of compressible liquid.

A further object of the present invention is to provide an improved hydraulic device for use in the suspension of motor vehicle bodies, which device will reduce the cost of such suspension and at the same time greatly enhance the riding qualities of the vehicle with which it is used.

In the drawings, Fig. 1 is a diagrammatic illustration of a motor vehicle showing the improved hydraulic suspension device interposed between the vehicle frame and one of the axles thereof, the near wheel having been removed; Figs. 2, 3 and 4 are transverse sections through the device on a greatly enlarged scale, the planes of the sections being indicated by the correspondingly numbered lines on Figs. 1 and 5; Figs. 5, 6 and 7 are vertical sections of the improved device, the plane of the sections being indicated by the lines 5—5 on Fig. 3; Fig. 8 is a fragmentary vertical section taken in the plane indicated by the lines 8—8 on Fig. 3 and illustrates

2 various parts of the device in different operating positions from that shown in Figs. 5, 6 and 7; Fig. 9 is a sectional detail taken in substantially the same plane as Fig. 5 but illustrating a different operating position of the parts.

Referring now to the drawings in detail and particularly to Fig. 1, there is indicated a motor vehicle frame 10, a rear axle unit 11 provided with wheels, one of which is shown at 12, a driving member 14 for transmitting power to the axle, and a device such as the rod 15 pivotally interconnected between the axle and the frame for transmitting the driving torque to the frame 10. The improved supporting device is generally indicated at 20 as being interposed between the frame 10 and the rear axle 11. The axle 11 is provided with a socket member generally indicated at 21 to receive a ball-like formation on the base of the supporting device, and the frame 10 is provided with a similar socket formation 22 to receive a ball-like device on the opposite end of the device as will be hereinafter more fully described.

The load supporting device 20 generally comprises a cylinder 25 closed at its lowest end by a cap 27 which may be secured thereto, as by a weld 28, and which is provided with a ball-like formation 29 projecting downwardly from its cap for cooperation with the axle socket 21 heretofore mentioned.

The cylinder or housing 25 is provided with a partition member 30. As shown, this partition has an elongated tubular portion 31 with a head 32, the latter being positioned substantially midway between the ends of the housing 25. The head 32 is of a diameter closely fitting the walls of the housing 25 and is held in tight engagement with a shoulder 33 formed in the housing wall by a cap 34 which closes the upper end of the cylinder and which is retained in position by a hollow nut 35. The partition member 32 divides the housing into a lower or main load supporting chamber 36 and two upper chambers 37 and 38, the chamber 37 comprising the area within the tubular portion 31 of the partition member 30, and the chamber 38 comprising the area surrounding the tubular portion 31 within the main cylinder 25. The chamber 37 provides, as will be hereinafter more fully explained, a supplemental load supporting and pump chamber, and the chamber 38 provides a fluid storage chamber.

A ram 40 is slidably mounted for axial movement in a tubular portion 31 of the partition 30. The upper end of this ram carries the connecting member, such as for instance, the ball 23 heretofore mentioned. The lower portion 41 of this ram is of a slightly smaller diameter than the upper portion and extends through and beyond the head 32 of the partition 30 and has secured to its lowermost ends a relatively small piston member 43. Suitable packing units, such as indicated at 44, 45 and 46, prevent the flow of liquid from the lower chamber 36 to the storage chamber 38 around the periphery of the partition, from the lower chamber 36 to the pump chamber 37 around the ram portion 41, and from the pump chamber 37 to the exterior of the device respectively around the ram 40.

Under normal conditions the main cylinder 36 is filled with a compressible liquid under pressure, such as for instance, an oil having a compressibility of one per cent at twenty five hundred pounds per square inch of pressure. Oil may be supplied initially to the chamber 36 through an opening 50 in the wall of the cylinder 25. This opening is normally sealed by a suitable plug 51. Similarly, oil may be supplied to the upper storage chamber 38 through a suitable opening 52 which may be closed by a plug 53. The plug 53 may comprise a valved plug of any well known type which will maintain the pressure in the chamber 38 substantially at atmospheric pressure but which will prevent any substantial escape of fluid from such chamber. The fluid in the main chamber 36 may be compressed by reciprocation of the ram 40. When the ram 40 is moved upward the upward movement of the shoulder 55 between the reduced portion of the ram and the main portion thereof reduces the pressure in the pump chamber 37, whereupon oil flows from the storage chamber 38 through a passageway 56, between the partition head 32 and the wall of the cylinder 25, into a passageway 57 which communicates with the chamber 37. Upon the downward stroke of the ram 40 a spring pressed valve member 58 closes the passageway 57 preventing a return of the fluid to the chamber 38 through such passageway.

When the pressure in the pump chamber 37 reaches the pressure in the main chamber 36, fluid will flow from the pump chamber through a passageway 60 in the partition head 32 past a check valve 61 which normally closes such passageway to a passageway 63 which opens into the main chamber 36. Thus it will be seen that by repeated reciprocation of the ram 40, the liquid in the chamber 36 may be compressed until a predetermined pressure head is built up.

To limit the pressure in the chamber 36, the pump chamber 37 is provided with a passageway 65 which is normally closed by a pressure relief valve 66. The passageway 65 extends between the pump chamber 37 and the storage chamber 38, accordingly the pressure in the pump chamber may be maintained at a predetermined maximum. The pressure relief valve 66 is preferably adjustable so that the pressure in the chamber 36 may be controlled to support the vehicle body and its normal load with the lower end of the ram in a predetermined position intermediate the ends of the cylinder 36, such as for instance, that indicated by the dotted lines 67.

The pressure relief valve is best illustrated in Figs. 3 and 8. As there shown, the passageway 65 has an enlarged portion 70 in which the valve member 66 is positioned, there being suitable clearance between the walls of the valve member and the wall of the passage 70 to permit fluid to flow therebetween. A spring 71 is interposed between the valve member 66 and a plug 72 which is threadingly mounted in the end partition head 32 and extends outward through a suitable opening in the housing 25. The plug 72 controls the pressure required to move the valve member 66 away from its seat. As illustrated, the plug may be turned in or out to increase or decrease the spring pressure on the valve member 65 so that the valve 65 will open at the desired pressure in the pump chamber. A lock nut 75 is provided to insure the maintenance of the adjustment of the plug 72 and to retain packing 76 in position to seal the opening in the cylinder 25.

Injury to the device which might result from severe impact or recoil actions which tend to move the ram 40 to either of its extreme positions is prevented by the provision of what may be termed fluid bumpers in the lower cylinder. Such bumpers comprise recesses 80 and 81 formed in the inner faces of cap 27 and partition head 32 respectively. These recesses are substantially the same diameter and depth as the piston-like head 43 mounted on the end of the ram. Each of the recesses 80 and 81 is provided with tapered entry surfaces 82 which, as the piston head 43 enters a recess permits the fluid therein to initially flow more or less rapidly from such recess, such flow diminishing as the piston head 43 seats deeper into the recess. Sufficient clearance is provided between the walls of each recess and the piston heads as to permit a small flow of liquid from the recess, thus enabling the absorption of the impact or recoil action of the ram 40.

Assuming that the chamber 36 of the device is filled with an oil of a type having one per cent compression when subjected to 2500 pounds per square inch pressure and that the fluid in the chamber 36 has been precompressed to support the dead load of the vehicle body with the lower end of the ram in the position indicated in Fig. 5, that is substantially at the dotted line 67, and that the upper storage chamber 38 is partially filled with oil under atmospheric pressure, then under such conditions, the oil in the main or load-supporting chamber 36 cannot escape, and hence the elasticity of the oil is depended upon to support the weight of the vehicle and its load. As the vehicle moves along the highway, normal road impacts cause the ram to reciprocate. As the ram moves downward, the pressure in the main chamber 36 is increased in proportion to the downward movement of the ram, thus absorbing the impact and retarding the movement of the vehicle body in response to such impact. Likewise, the pressure in the chamber 37 is increased. However, when such pressure reaches that pressure for which the release valve 65 is adjusted, fluid will flow from such chamber to the storage chamber 38. However, should the pressure in the chamber 36 be decreased below that for which the check valve is set, due to seepage of a small amount which is inherent in all such devices, the normal pressure will immediately be restored before the check opens.

The relative proportions of the dimensions of the ram, the chamber 36, and the chamber 38, are such that the pressure of the oil within the pump chamber 37, increases at a much faster rate as the ram descends than does the pressure of the oil in the main chamber 36. This differential rate of pressure ensures the maintenance of the desired pressure in the lower or main chamber. On the recoil or upward movement of the ram, the offset shoulder 55 thereof draws fluid from the storage chamber 38 into the pump chamber 37, past the valve 58, filling the pump chamber 37 with oil so that consequent upon the next downward stroke, the ram 40 will again function as a pump to maintain the desired pressure in the main chamber.

As heretofore described, the main chamber 36 is initially filled with oil under a predetermined pressure. This may be accomplished preferably by building up the pressure prior to the installation of the device upon the vehicle. It is to be noted that the portion of the ram 40 which extends into the main chamber 36 is smaller in diameter than the diameter of such chamber. The relationship of these diameters is important as it controls the relation between the increase in pressure in the chamber 36 relative to the length of stroke of the ram 40 and thus controls the amount of movement of the ram under impacts.

For example, assuming a static load of 900 pounds applied to the device and assuming that the oil used is compressible at the rate of one per cent per 2,500 pounds per square inch of pressure exerted thereon, then satisfactory results would be obtained by using an inside diameter of 2¼ inches and a length of 6 inches for the main chamber 36, and by using an inside diameter of $\frac{7}{16}$ inch and a length of 6 inches for the chamber 37, together with a ram which has a diameter of ⅜ inch in the reduced portion 41. In addition, the load on the valve 66 should be adjusted so that it will open at a pressure of approximately 6,000 pounds per square inch.

The areas and capacities of the chambers 36 and 37 and of the ram are preferably so selected that a comparatively small upward movement of the ram 40 results in the reduction of the pressure in the pump chamber 37 to atmospheric pressure and the supporting of substantially the entire load by the liquid in the main chamber 36. This rapid transferring to the main chamber 36 of the portion of the load previously supported by the pump chamber 37 results in the dampening of the recoil action and greatly enhances the shock absorbing qualities of the device. In the example given these relationships are such that the upward or recoil movement of the ram 40 reduces the pressure in the pump cylinder 37 from its maximum, of approximately 6000 pounds per square inch, to atmospheric pressure in a small fraction of an inch of movement of the ram. Following the recoil the downward stroke of the ram builds the pressure in the pump cylinder up to its maximum consequent upon a downward movement of a fraction of an inch of the ram, whereupon the pump cylinder resumes its portion of the load and thus dampens the downward movement of the ram. Accordingly, all vibratory movements of the ram are rapidly and effectively dampened. The advantages of such action of the device over the action of metallic springs is thus apparent.

In most applications, liquids are considered to be incompressible. However, when certain liquids and particularly certain oils are subjected to pressure they are compressible, even though the factor of compressibility is small. Some liquids have an average rate of compressibility of one per cent for each twenty-five hundred pounds per square inch of pressure exerted thereon. An example of such is an oil known under U. S. Army specifications as "Univis J-43." Such oil provides the resilient resistance required for the example heretofore set forth. Other oils of similar densities and compressibilities are known at the present time. Obviously the device may be proportioned for use with liquids having a rate of compressibility differing from the above without departing from the spirit of the present invention.

From the foregoing description it will be seen that the improved device supports the load at all times on a confined body of compressible liquid, the elasticity of which is depended upon to resiliently support the load. It will likewise be seen that the arrangement of the device is such that the load supporting pressure may be adjusted within practical limits and that such pressure will be maintained by the normal action of the device as the vehicle progresses along the highway. It will also be seen that the device is comparatively simple and that it may be economically manufactured, installed and maintained.

I claim:

1. A resilient device for supporting one member from another member movable relative thereto and comprising a housing secured to one of said members having an upper chamber and lower main chamber, the upper chamber being divided into inner and outer chambers, the inner chamber comprising a pump chamber and the outer chamber comprising a liquid storage chamber, a ram secured to the other of said members and mounted for reciprocation through the pump chamber into the main chamber, said main chamber being filled with a compressible liquid under sufficient pressure to normally support said ram, the member secured thereto and a load carried thereby with the end of the ram disposed intermediate the ends of the main chamber when said ram together with its associated member and load are under static load conditions, said supply chamber having a supply of the same liquid in said main chamber, said ram having a portion of increased cross sectional area forming a shoulder in said pump chamber facing said main chamber, a valved controlled passageway through which liquid may flow from the storage chamber into the pump chamber consequent upon movement of the ram in a direction away from the main chamber, a valve controlled passageway through which liquid may flow from the pump chamber to the main chamber consequent upon movement of the ram into the main chamber, and a valved controlled by-pass between the pump chamber and the storage chamber to prevent the liquid pressure in the pump chamber from exceeding a predetermined maximum.

2. A resilient device for connecting one member with another member movable relative thereto, said device comprising a body secured to one of said members having an upper chamber and a lower main chamber, said upper chamber being divided into inner and outer chambers, said inner chamber comprising a pump chamber and having an area and volume small in comparison to the area and volume of the main chamber, said outer chamber comprising a liquid storage chamber, a ram secured to the other of said members and mounted for reciprocation in and extending through the pump chamber into the main chamber, said main chamber being filled with a compressible fluid under pressure, said ram having an enlarged upper portion forming a downwardly facing shoulder in said pump chamber, a passageway extending between the bottom of said pump chamber and said main chamber, a valve in said passageway to permit the flow of liquid therethrough from the pump chamber to the main chamber when the pressure in the pump chamber exceeds the pressure in the main chamber, a passageway between the pump chamber and the storage chamber, a valve in said last named passageway to permit fluid to flow from the storage chamber into the pump chamber when the pressure in the pump chamber is less than the pressure in the storage chamber and to prevent flow of liquid in a reverse direction, a second passageway extending between said pump chamber and the storage chamber, a valve in said last named passageway to permit the liquid from the pump chamber to the storage chamber whenever the pressure in the pump chamber exceeds a predetermined maximum.

3. A resilient device for supporting a vehicle body from its axle, said device comprising a housing having its lower end adapted to be connected to the vehicle axle, said housing having a lower main chamber, an upper pump chamber in axial alignment with the main chamber and a liquid supply chamber, the area and volume of the pump chamber being small in comparison with the area and volume of the main chamber, a ram having one end adapted to be connected with the vehicle body and mounted for reciprocation in said housing and extending through the pump chamber and projecting into the main chamber, said main chamber being filled with a compressible liquid under pressure, said ram being provided with a shoulder in said pump chamber facing said main chamber and forming a pump piston, a passageway extending between the lower end of said pump chamber into said main chamber, a valve in said passageway to permit the flow of liquid therethrough from the pump chamber to the main chamber when the pressure in the pump chamber exceeds the pressure in the main chamber and to prevent the flow of liquid in a reverse direction, a passageway between the lower end of the pump chamber and the storage chamber, a valve in said last named passageway to permit liquid to flow from the storage chamber into the pump chamber when the pressure in the pump chamber is less than the pressure in the storage chamber and to prevent flow of liquid therethrough in a reverse direction, a second passageway extending between said pump chamber and the storage chamber, a valve in said last named passageway to permit the liquid from the pump chamber to the storage chamber whenever the pressure in the pump chamber exceeds a predetermined maximum and to prevent the flow of liquid in a reverse direction, and means accessible from the exterior of said housing to adjust said valve to change the maximum pressure as desired.

LUCIEN ROBERT GRUSS.

REFERENCES CITED

The following references are of record in the file of this patent:

UNITED STATES PATENTS

| Number | Name | Date |
|---|---|---|
| 1,505,036 | Lanchester | Aug. 12, 1924 |
| 1,886,712 | Messier | Nov. 8, 1932 |
| 2,333,096 | Dowty | Nov. 2, 1943 |

FOREIGN PATENTS

| Number | Country | Date |
|---|---|---|
| 105,053 | Great Britain | Mar. 21, 1917 |